United States Patent
Liu et al.

(10) Patent No.: US 9,787,785 B2
(45) Date of Patent: Oct. 10, 2017

(54) PROVIDING RECOMMENDATIONS FOR ELECTRONIC PRESENTATIONS BASED ON CONTEXTUAL AND BEHAVIORAL DATA

(71) Applicant: LinkedIn Corporation, Mountain View, CA (US)

(72) Inventors: Haishan Liu, Sunnyvale, CA (US); Lili Wu, Palo Alto, CA (US); Yanen Li, Foster City, CA (US); Liang Tang, Sunnyvale, CA (US); Baoshi Yan, Belmont, CA (US); Anmol Bhasin, Los Altos, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 132 days.

(21) Appl. No.: 14/473,576

(22) Filed: Aug. 29, 2014

(65) Prior Publication Data

US 2016/0034425 A1   Feb. 4, 2016

Related U.S. Application Data

(60) Provisional application No. 62/031,788, filed on Jul. 31, 2014.

(51) Int. Cl.
*G06F 17/00* (2006.01)
*H04L 29/08* (2006.01)
(Continued)

(52) U.S. Cl.
CPC ........ *H04L 67/22* (2013.01); *G06F 17/30029* (2013.01); *G06F 17/30056* (2013.01); *G06F 17/30905* (2013.01); *G06Q 30/0251* (2013.01); *G06Q 30/0269* (2013.01); *G06Q 50/01* (2013.01)

(58) Field of Classification Search
CPC ......... G06F 17/30017; G06F 17/30038; G06F 17/30056; G06F 17/30905
See application file for complete search history.

(56) References Cited

U.S. PATENT DOCUMENTS

2010/0205541 A1* 8/2010 Rapaport ............... G06Q 10/10
                                                              715/753
2010/0287048 A1* 11/2010 Ramer ................... G06Q 30/02
                                                              705/14.46

(Continued)

*Primary Examiner* — Stephen Hong
*Assistant Examiner* — Gregory Vaughn
(74) *Attorney, Agent, or Firm* — Schwegman Lundberg & Woessner, P.A.

(57) ABSTRACT

Systems and methods are disclosed that recommend one or more electronic presentations to a user based on one or more factors. These factors may include contextual information, behavioral information, profile information, or combinations of the foregoing. Contextual information may include content and/or features extracted from a given electronic presentation. Behavioral information may include user behavioral data, such as the number of times a user has viewed a presentation, the amount of the presentation viewed by the user, presentations previously viewed by the user, and other such behavioral data. Profile information may include user professional profile information, such as skills the user has identified as possessing, employment history information, and other such user professional profile information.

20 Claims, 10 Drawing Sheets

(51) Int. Cl.
*G06F 17/30* (2006.01)
*G06Q 30/02* (2012.01)
*G06Q 50/00* (2012.01)

(56) References Cited

U.S. PATENT DOCUMENTS

| | | | |
|---|---|---|---|
| 2011/0143811 A1* | 6/2011 | Rodriguez | G06K 9/00986 455/556.1 |
| 2013/0290488 A1* | 10/2013 | Mandalia | H04L 65/4084 709/219 |
| 2013/0311329 A1* | 11/2013 | Knudson | G06Q 50/01 705/26.9 |
| 2014/0080428 A1* | 3/2014 | Rhoads | G06F 17/30241 455/88 |
| 2014/0100944 A1* | 4/2014 | Zhu | G06Q 30/0275 705/14.41 |
| 2014/0128105 A1* | 5/2014 | Su | H04W 4/021 455/456.3 |
| 2014/0156566 A1* | 6/2014 | Kabiljo | G06N 99/005 706/12 |
| 2014/0258032 A1* | 9/2014 | Psota | G06Q 30/02 705/26.35 |
| 2014/0278220 A1* | 9/2014 | Yuen | G01B 21/16 702/150 |

* cited by examiner

FIG. 6

PROVIDING RECOMMENDATIONS FOR ELECTRONIC PRESENTATIONS BASED ON CONTEXTUAL AND BEHAVIORAL DATA

CROSS-REFERENCE TO RELATED APPLICATIONS

This application claims the benefit of priority to U.S. Pat. App. No. 62/031,788 filed Jul. 31, 2014 and titled "Providing Recommendations For Electronic Presentations Based on Contextual and Behavioral Data," which is incorporated by reference herein.

TECHNICAL FIELD

The subject matter disclosed herein generally relates to a system and method for providing recommendations for electronic presentations and, in particular, providing such recommendations based on user profile information, user behavioral information, and the context and/or subject matter of a given electronic presentation.

BACKGROUND

An electronic presentation may include information that a user finds interesting. For example, an electronic presentation may include audiovisual and/or textual content that engages the user. The electronic presentation may be available from a repository of other electronic presentations. For example, a user may visit a website where electronic presentations are made available to the user. Using a graphical user interface, the user may select and view an electronic presentation made available through the graphical user interface. Furthermore, in some instances, a user may desire to find other electronic presentations similar to the one the user just viewed (or is viewing). However, where the repository has thousands of electronic presentations, it can be laborious and time-consuming for the user to have to sift through all those electronic presentations for the user to find those that the user finds interesting. Furthermore, there may be other electronic presentations that would be helpful or interesting to the user, but the user may never find them because it would take too long for the user to do so. In these instances, the user may miss out on electronic presentations that would be interesting or relevant to the user's needs.

BRIEF DESCRIPTION OF THE DRAWINGS

Some embodiments are illustrated by way of example and not limitation in the figures of the accompanying drawings.

FIG. 6 illustrates a member profile, in accordance with an example embodiment, hosted by the social networking server.

DETAILED DESCRIPTION

Figure 1:
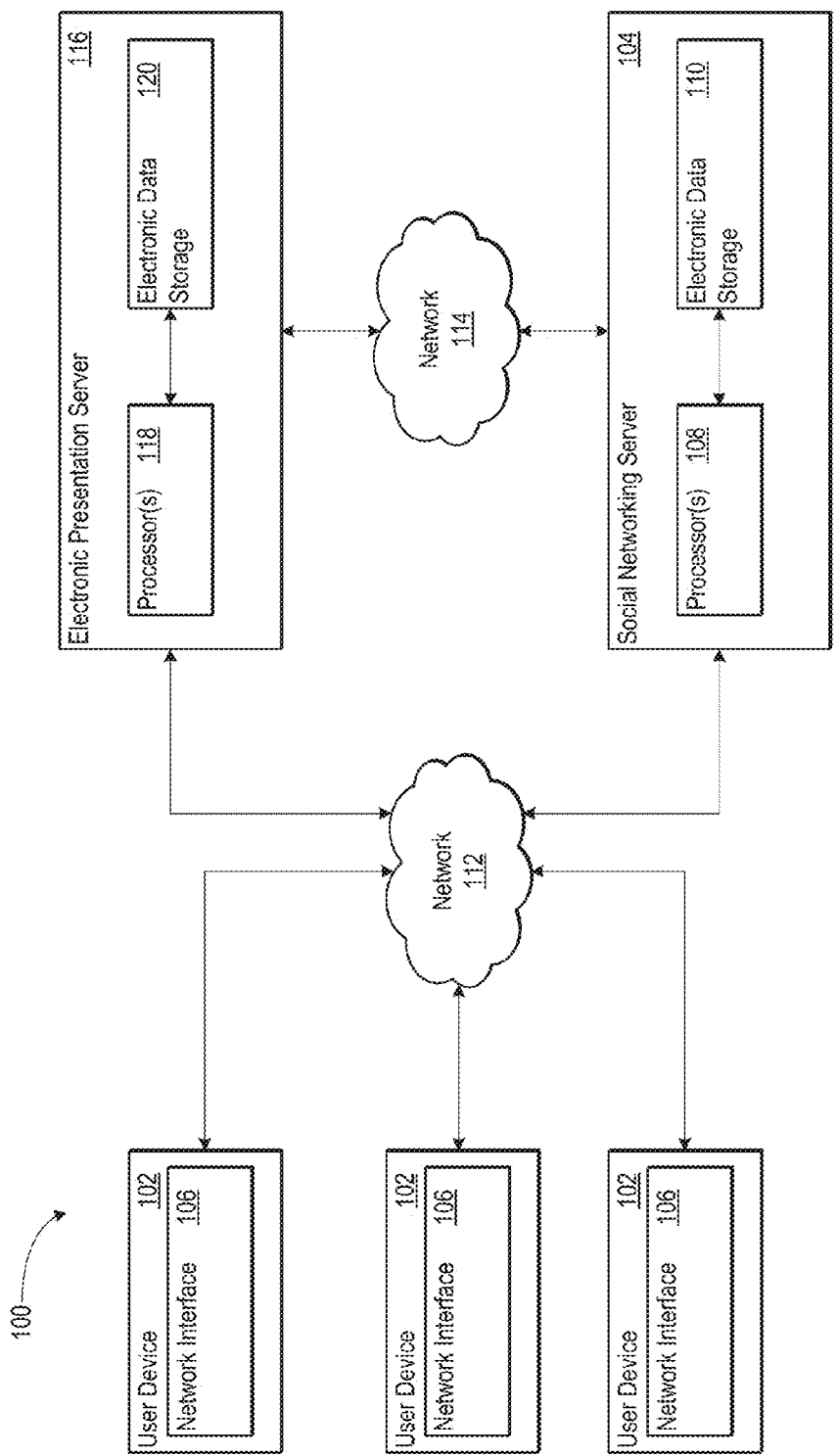
FIG. 1 is a block diagram of a system, in accordance with an example embodiment, for recommending electronic presentations.

Example methods and systems are directed to recommending one or more electronic presentations to a user. The systems and methods may recommend the one or more electronic presentations based on several factors, including contextual factors, behavioral factors, profile factors, or combinations of the foregoing. In one embodiment, the disclosed systems and methods may extract content and features from a given presentation and recommend other electronic presentations based on the extracted content and features. In another embodiment, the disclosed systems and methods may obtain user behavioral data, such as the number of times a user has viewed a presentation, the amount of the presentation viewed by the user, and other such behavioral data, and recommend one or more electronic presentations based on the obtained behavioral data. In yet a further embodiment, the disclosed systems and methods may obtain user professional profile information, such as skills the user has identified as possessing, employment history information, and other such user professional profile information, and may recommend one or more electronic presentations based on the obtained user professional profile information.

Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In one embodiment, this disclosure provides for a computer-implemented method that includes extracting presentation content from a first electronic presentation being accessible to a plurality of users, the presentation content including at least one of graphical content, textual content, or audio content, determining a plurality of features from the extracted presentation content, the plurality of features representing individual elements used to construct the extracted presentation content, and determining a second electronic presentation as a recommended electronic presentation based on the determined features.

In another embodiment, the method may include extracting presentation content from the first electronic presentation occurs based on a predetermined condition being satisfied.

In a further embodiment, the predetermined condition is the expiration of a predetermined time interval.

In yet another embodiment of the method, the method may include obtaining user behavior data for the first electronic presentation, and the determining of the second electronic presentation is further based on the obtained user behavior data.

In yet a further embodiment of the method, the user behavior data comprises user interaction data with the first electronic presentation.

In another embodiment of the method, the method may include obtaining user profile data for a user having requested the first electronic presentation, and the determining of the second electronic presentation is further based on the obtained user profile data.

In a further embodiment of the method, the method may include causing the display of the recommended electronic presentation based on a user having viewed the first electronic presentation.

This disclosure also provides for a system that may include a non-transitory, computer-readable medium storing computer-executable instructions, and one or more processors in communication with the non-transitory, computer-readable medium that, having executed the computer-executable instructions, are configured to extract presentation content from a first electronic presentation being accessible to a plurality of users, the presentation content including at least one of graphical content, textual content, or audio content, determine a plurality of features from the extracted presentation content, the plurality of features representing individual elements used to construct the extracted presentation content, and determine a second electronic presentation as a recommended electronic presentation based on the determined features.

In another embodiment of the system, the presentation content extracted from the first electronic presentation occurs based on a predetermined condition being satisfied.

In a further embodiment of the system, the predetermined condition is the expiration of a predetermined time interval.

In yet another embodiment of the system, the one or more processors are further configured to obtain user behavior data for the first electronic presentation, and the second electronic presentation is further determined based on the obtained user behavior data.

In yet a further embodiment of the system, the user behavior data comprises user interaction data with the first electronic presentation.

In another embodiment of the system, the one or more processors are further configured to obtain user profile data for a user having requested the first electronic presentation, and the second electronic presentation is further determined based on the obtained user profile data.

In a further embodiment of the system, the one or more processors are further configured to cause the display of the recommended electronic presentation based on a user having viewed the first electronic presentation.

This disclosures provides for another method that may include receiving a plurality of electronic presentations, the plurality of electronic presentations being accessible to a plurality of users via an electronic presentation system, based on a predetermined condition being met, extracting content for each of the plurality of electronic presentations, communicating the extracted content from the electronic presentation system to a social networking system, determining a plurality of features for the extracted content, based on the determined plurality of features; determining a recommended electronic presentation selected from the plurality of electronic presentations for a given electronic presentation selected from the plurality of electronic presentations, and communicating the determined recommended electronic presentation to the electronic presentation system.

In another embodiment of the method, the predetermined condition comprises an expiration of a predetermined time interval.

In a further embodiment of the method, the extracted content comprises at least one of a graphic, text, or audio.

In yet another embodiment of the method, the method includes receiving user interactions with the given electronic presentation, and the determined recommended electronic presentation is further based on the received user interactions.

In yet a further embodiment of the method, the user interactions include which electronic presentations from the plurality of electronic presentations the user has viewed after having viewed the given electronic presentation.

In another embodiment of the method, the determined recommendation electronic presentation is displayed in response to the given electronic presentation being viewed by a user.

FIG. 1 is a block diagram of a system 100, in accordance with an example embodiment, for recommending electronic presentations. In one embodiment, the system 100 includes user devices 102, a social networking server 104, and an electronic presentation server 116. The particular type of social networking server may be referred to as a business network server. User devices 102 may be a personal computer, netbook, electronic notebook, smartphone, or any electronic device known in the art that is configured to display web pages. The user devices 102 may include a network interface 106 that is communicatively coupled to a wide area network ("WAN") 112, such as the Internet.

The social networking server 104 may be communicatively coupled to the network 112. The server 104 may be an individual server or a cluster of servers, and may be configured to perform activities related to serving the social network, such as storing social network information, processing social network information according to scripts and software applications, transmitting information to present social network information to users of the social network, and receive information from users of the social network. The server 104 may include one or more electronic data storage devices 110, such as a hard drive, optical drive, magnetic tape drive, or other such non-transitory, computer-readable media, and may further include one or more processors 108.

The one or more processors 108 may be any type of commercially available processors, such as processors available from the Intel Corporation, Advanced Micro Devices, Texas Instruments, or other such processors. Furthermore, the one or more processors 108 may be of any combination of processors, such as processors arranged to perform distributed computing via the social networking server 104.

The social networking server 104 may store information in the electronic data storage device 110 related to users and/or members of the social network, such as in the form of user characteristics corresponding to individual users of the social network. For instance, for an individual user, the user's characteristics may include one or more profile data points, including, for instance, name, age, gender, profession, prior work history or experience, educational achievement, location, citizenship status, leisure activities, likes and dislikes, and so forth. The user's characteristics may further include behavior or activities within and without the social network, as well as the user's social graph. In addition, a user and/or member may identify an association with an organization (e.g., a corporation, government entity, non-profit organization, etc.), and the social networking server 104 may be configured to group the user profile and/or member profile according to the associated organization.

For an organization, information about the organization may include name, offered products for sale, available job postings, organizational interests, forthcoming activities, and the like. For a particular available job posting, the job posting can include a job profile that includes one or more job characteristics, such as, for instance, area of expertise, prior experience, pay grade, residency or immigration status, and the like.

The electronic presentation server 116 may be communicatively coupled to the network 112. The electronic presentation server 116 may be an individual server or a cluster of servers, and may be configured to perform activities related to serving one or more electronic presentations to the user devices 102, such as storing electronic presentations, processing the electronic presentations according to scripts and software applications, transmitting information to present the electronic presentations to users of the electronic presentation server 116, and receive electronic presentations from users via the user devices 102. The presentation server 116 may include one or more electronic data storage devices 120, such as a hard drive, optical drive, magnetic tape drive, or other such non-transitory, computer-readable media, and may further include one or more processors 108.

The one or more processors 118 may be any type of commercially available processors, such as processors available from the Intel Corporation, Advanced Micro Devices, Texas Instruments, or other such processors. Furthermore, the one or more processors 118 may be of any combination of processors, such as processors arranged to perform distributed computing via the electronic presentation server 116.

The electronic presentation server 116 may store information in the electronic data storage device 120 related to users of the electronic presentation server 116 and information related to the electronic presentations. Information about electronic presentations may include the content of the electronic presentations, metadata and/or other topical information describing the content of the electronic presentations, the manner in which to display an electronic presentation, and other such information. Information related to the users of the electronic presentation server 116 may include behavioral information, such as the number of times a user has selected a given electronic presentation, the amount of time the user viewed an electronic presentation, the amount of the electronic presentation the user viewed, the types of electronic presentations the user has viewed, and other such behavioral information.

Furthermore, the electronic presentation server 116 may be communicatively coupled to the social networking server 104 via a network 114, which may be a Local Area Network ("LAN"), WAN, or combinations of LANs and WANs. By being communicatively coupled to the social networking server 104, a user may access the electronic presentation server 116 with a profile stored by the social networking server 104. Furthermore, a user having a member profile with the social networking server 104 may provide an electronic presentation to the electronic presentation server 116, and then may provide a Uniform Resource Location ("URL") to the provided electronic presentation via the user's member profile. Thus, an external user viewing the member profile may view profile information about the user and may have access to the electronic presentation.

In addition, the electronic presentation server 116 may operate in conjunction with the social networking server 104 to obtain recommendations for users about electronic presentations. As discussed below, the electronic presentation server 116 may communicate one or more types of information to the social networking server 104 and, in turn, may receive one or more recommendations associated with various electronic presentations.

To support these other and functionalities, the electronic presentation server 116 and the social networking server 104 may include a messaging engine to send and receive messages from one another. In one instance, the electronic presentation server 116 may be a producer of messages and the social networking server 104 may be a consumer of those messages. In another instance, the social networking server 104 may be a producer of messages and the electronic presentation server 116 may be a consumer of such messages.

Figure 2:
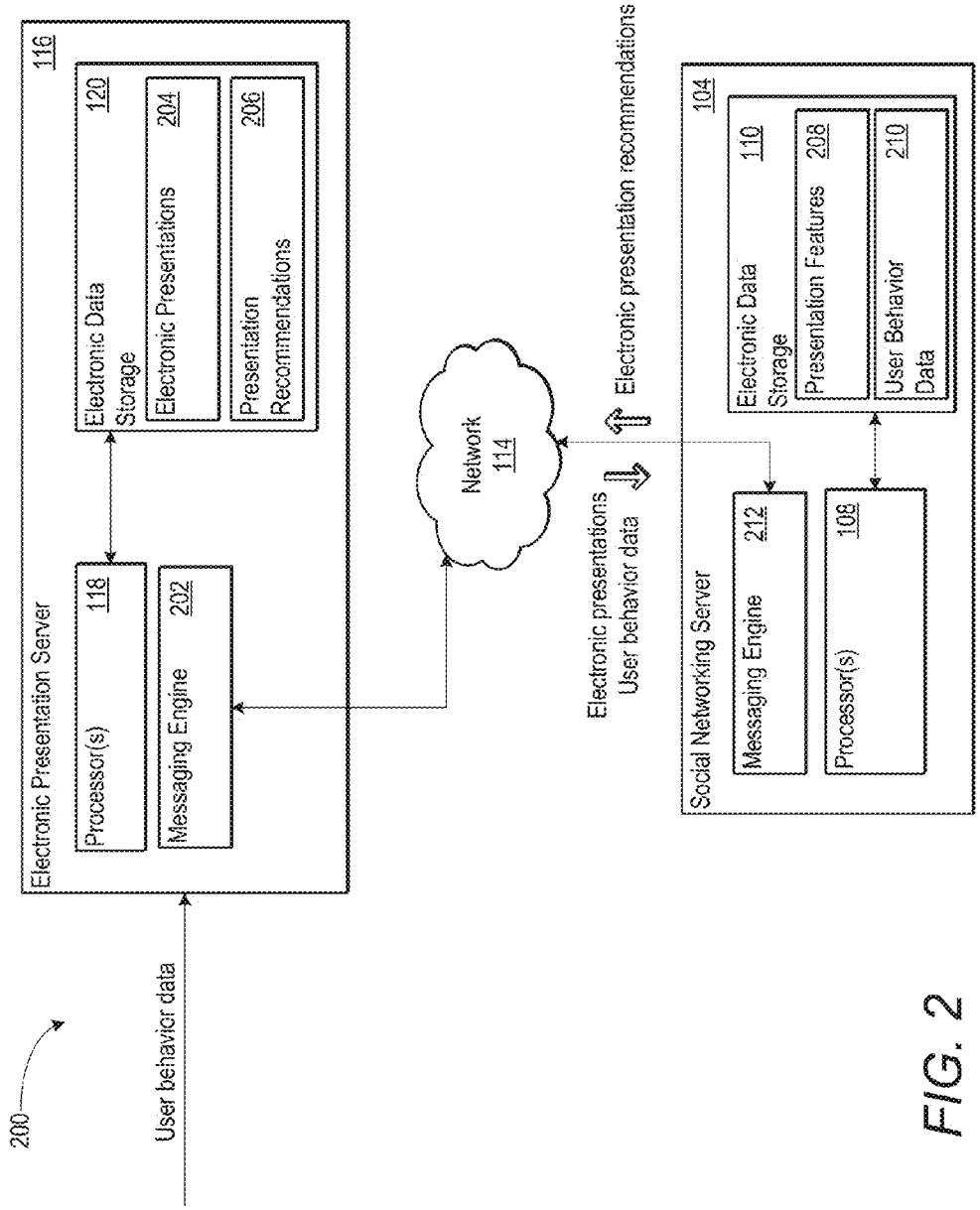
FIG. 2 is a block diagram illustrating an arrangement, in accordance with an example embodiment, of the of the electronic presentation server and the social networking server configured to exchange messages.

FIG. 2 is a block diagram illustrating an arrangement 200, in accordance with an example embodiment, of the of the electronic presentation server 116 and the social networking server 104 configured to exchange messages. In one embodiment, the electronic presentation server 116 may include a messaging engine 202 configured to send and receive messages to and from the social networking server 104. Similarly, the social networking server 104 may include a messaging engine 212 configured to send and receive messages to and from the electronic presentation server 116. Although shown as being housed within the electronic presentation server 116 and the social networking server 104, the messaging 202 and/or the messaging engine 212 may be housed within a differently physical structure or be distributed across multiple servers and/or computers. In one embodiment, the messaging engine 202 and/or messaging engine 212 may be Apache Kafka, which is available from the Apache Software Foundation.

In one embodiment, the electronic presentation server 116 may communicate content from one or more electronic presentations 204 stored in the electronic data storage 120 to the social networking server 104 via the messaging engine 202. The electronic presentation server 116 may also communicate user behavioral data relating to the electronic presentations 204 via the messaging engine 202.

The data communicated from the electronic presentation server 116 to the social networking server 104 may occur based on various conditions. For example, the electronic presentation server 116 may communicate the electronic presentation content and/or the behavioral data at predetermined time intervals (e.g., weekly, daily, monthly, etc.). In another example, the electronic presentation 116 may communicate with the social networking server 104 when a user and/or member of the social networking server 104 access the electronic presentation server 116 (e.g., provides login credentials to the electronic presentation server 116).

When the social networking server 104 receives the presentation content and/or behavioral data, the social networking server 104 may determine one or more recommendations for the received presentations. In one embodiment, the social networking server 104 may extract presentation features 208 from the presentation content and may store the behavioral data as user behavior data 210 in the electronic data storage 110. The social networking server 104 may also leverage a user's professional profile data (not shown) to determine the presentation recommendations for the electronic presentation server 116. Once determined, the social networking server 104 may then communicate one or more recommendations to the electronic presentation server 116 via the messaging engine 212. The electronic presentation server 116 may then incorporate the presentation recommendations as presentation recommendation data 206 stored in the electronic data storage 120. Thus, when a user views an electronic presentation, the electronic presentation server 116 may be configured to display one or more recommendations for other presentations based on the presentation recommendations 206.

Figure 3:
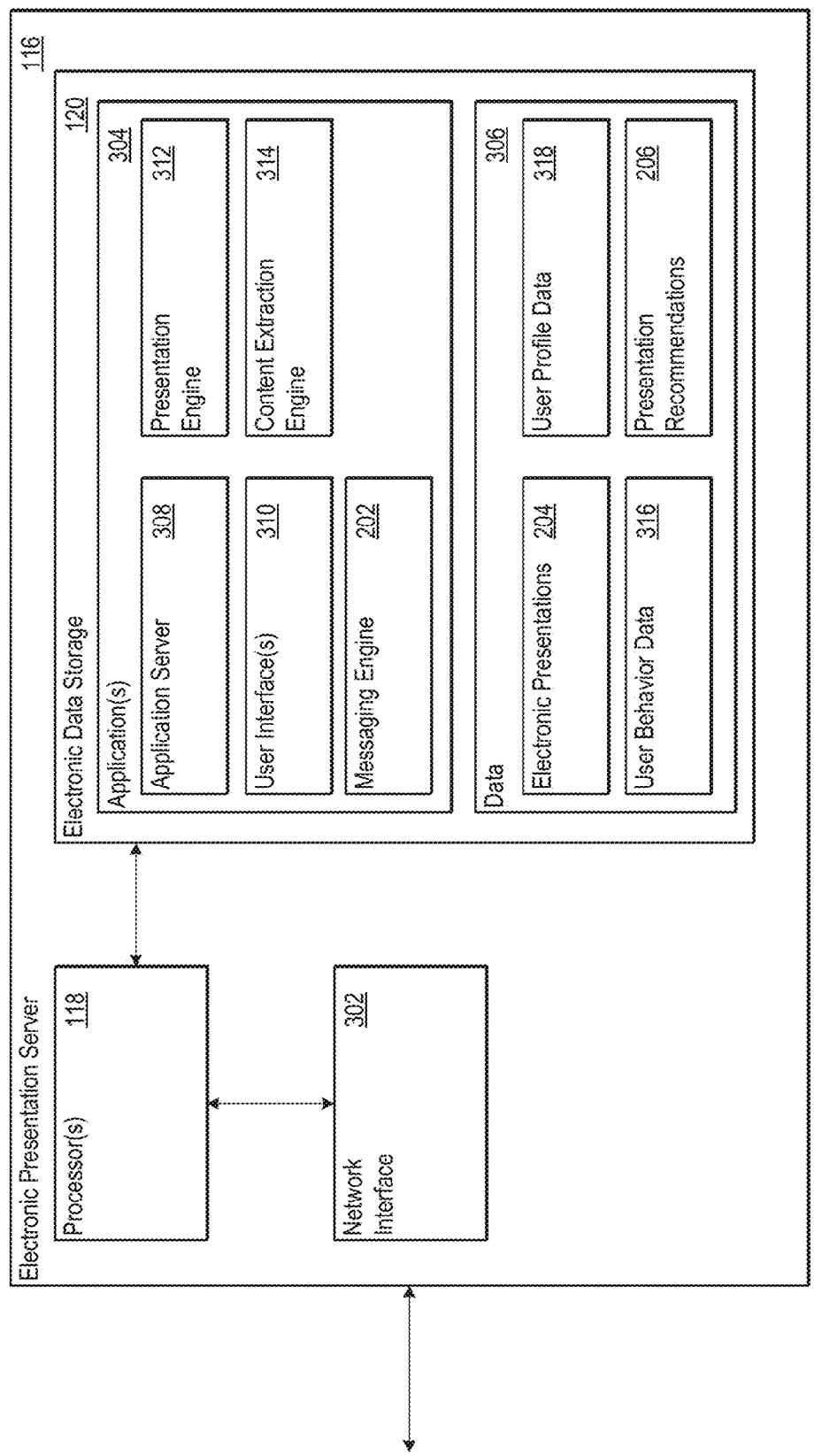
FIG. 3 illustrates the electronic presentation server shown in FIG. 1 in accordance with an example embodiment.

FIG. 3 illustrates the electronic presentation server 116 shown in FIG. 1 in accordance with an example embodiment. In one embodiment, the electronic presentation server 116 may include one or more processor(s) 118, one or more network interface(s) 302, one or more application(s) 304, and data 306 used by the one or more application(s) 304 stored in the electronic data storage 120.

As is understood by skilled artisans in the relevant computer and Internet-related arts, the various applications and/or engines shown in FIG. 3 may represent a set of executable software instructions and the corresponding hardware (e.g., memory and processor) for executing the instructions. To avoid obscuring the subject matter with unnecessary detail, various applications that are not germane to conveying an understanding of the inventive subject matter have been omitted from FIG. 3. However, a skilled artisan will readily recognize that various additional applications, engines, modules, etc., may be used with the electronic presentation server 116 such as that illustrated in FIG. 3, to facilitate additional functionality that is not specifically described herein. Furthermore, the various applications depicted in FIG. 3 may reside on a single server computer, or may be distributed across several server computers in various arrangements.

The electronic presentation server 116 may also include data 306, which may include one or more databases or other data stores that support the functionalities of the applications 304. In particular, data 306 may include electronic presentations 204, user behavior data 316, user profile data 318, and/or presentation recommendations 206. While shown as being housed in the same box as application(s) 304, it should be understood that data 306 may be housed in another location or across locations (e.g., in a distributed computing environment).

The front end of the electronic presentation server 116 may be provided by one or more user interface application(s) 310, which may receive requests from various client computing devices, and may communicate appropriate responses to the requesting client devices. For example, the user interface application(s) 310 may receive requests in the form of Hypertext Transport Protocol (HTTP) requests, or other web-based, application programming interface (API) requests. An application server 308 working in conjunction with the one or more user interface application(s) 310 may generate various user interfaces (e.g., web pages) with data retrieved from various data sources stored in the data 306. In some embodiments, individual application(s) (e.g., applications 202,308-314) may be used to implement the functionality associated with various services and features of the system 100. For instance, displaying an electronic presentation or displaying recommendations for an electronic presentation may be handled by a presentation engine 312. As another example, extracting content from an electronic presentation, such as graphics, sounds, texts, and other such content, may be handled by a content extraction engine 314.

In one embodiment, the content extraction engine 314 may extract content from an electronic presentation, such as content from the title, description, transcript, authorship, one or more tags used to classify the electronic presentation, comments regarding the electronic presentation, and other such content. The content extraction engine 314 may employ one or more classifiers that classify the extracted content.

The electronic presentation server 116 may communicate one or more items of information to the social networking server 104 via the messaging engine 202. Examples of such items of information include, but are not limited to, the content extracted from one or more electronic presentations, user behavior data 316, user profile data 316, the electronic presentations 204 (or identifiers thereof), and other such data.

In one embodiment, the electronic presentation server 116 extracts authorship information from the one or more electronic presentations to be used in formulating a recommendation. Where the authorship indicates that a particular electronic presentation is by a well-known or respected author, the authorship information may increase the likelihood that a given electronic presentation is recommended for viewing. In addition, where a given electronic presentation is authored is by an author that is within a viewer's social network, the degree of closeness of the author within the viewer's social network may increase the likelihood that a given electronic presentation is recommended to a viewer. For example, a first electronic presentation by an author that is directly connected to a viewer (e.g., is a viewer's coworker) may have an increased likelihood of being recommended than a second electronic presentation by another author that is connected to the viewer's co-worker (e.g., has a 2nd-degree relationship with the viewer).

Figure 4:
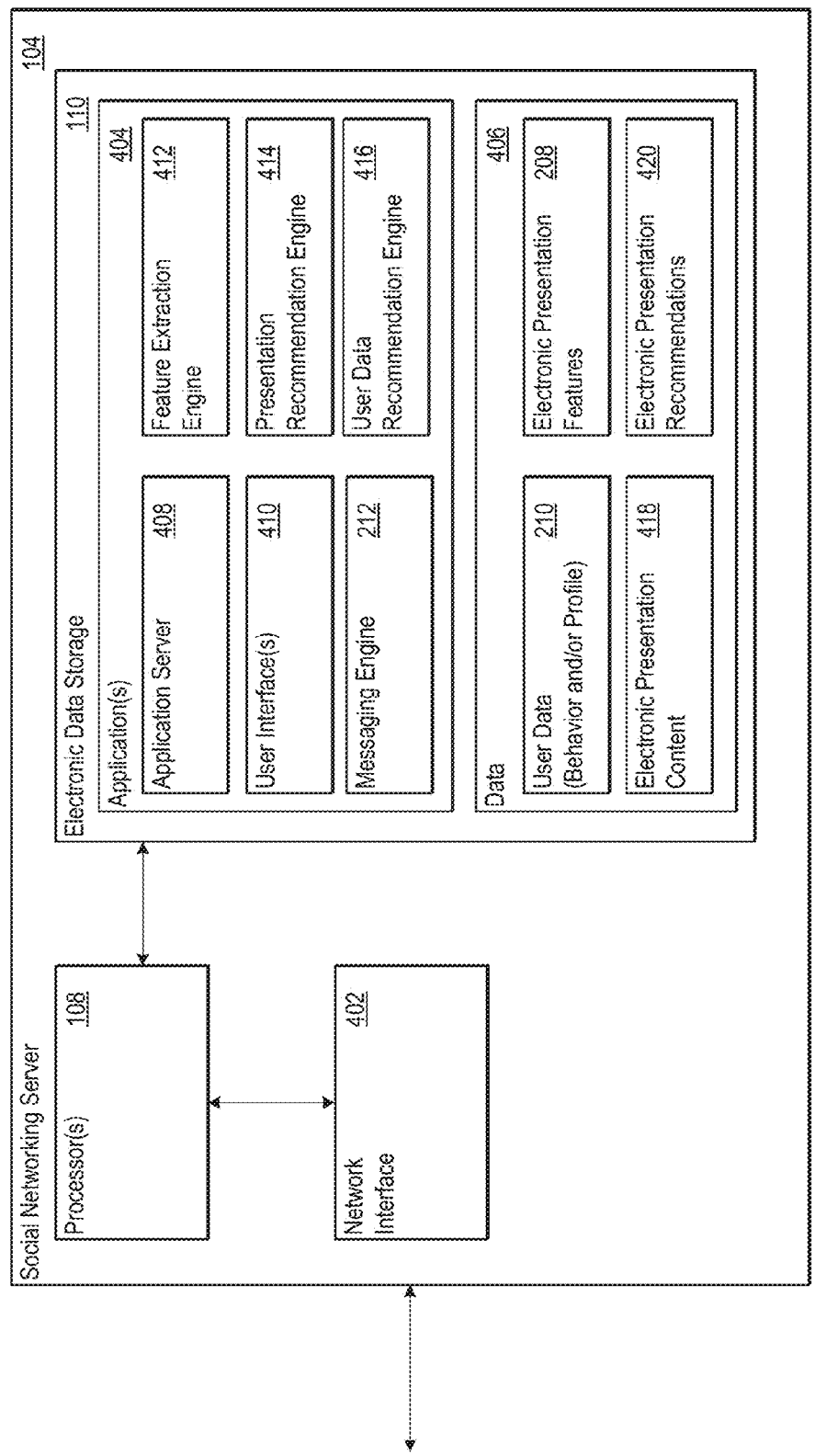
FIG. 4 illustrates the social networking server shown in FIG. 1 in accordance with an example embodiment.

FIG. 4 illustrates the social networking server 104 in accordance with an example embodiment. In one embodiment, the social networking server 104 may include one or more processor(s) 108, one or more network interface(s) 402, one or more application(s) 404, and data 406 used by the one or more application(s) 404 stored in the electronic data storage 110.

As is understood by skilled artisans in the relevant computer and Internet-related arts, the various applications and/or engines shown in FIG. 4 may represent a set of executable software instructions and the corresponding hardware (e.g., memory and processor) for executing the instructions. To avoid obscuring the subject matter with unnecessary detail, various applications that are not germane to conveying an understanding of the inventive subject matter have been omitted from FIG. 4. However, a skilled artisan will readily recognize that various additional applications, engines, modules, etc., may be used with the social networking server 104, such as that illustrated in FIG. 4, to facilitate additional functionality that is not specifically described herein. Furthermore, the various applications depicted in FIG. 4 may reside on a single server computer, or may be distributed across several server computers in various arrangements.

The social networking server 104 may also include data 406, which may include one or more databases or other data stores that support the functionalities of the applications 404. In particular, data 406 may include user data 210, which may include user behavioral and/or profile data, electronic presentation content 418 sent from the electronic presentation server 116, electronic presentation features 208 extracted from the electronic presentation content 418, and electronic presentation recommendations 420. The electronic presentation recommendations 420 may be based on the electronic presentation features 208, the user data 210, or a combination of the two. After the social networking server 104 has determine one or more recommendations for one or more of the electronic presentations, the social networking server 104 may communicate the electronic presentation recommendations 420 to the electronic presentation server 116 via the messaging engine 212.

The front end of the electronic presentation server 104 may be provided by one or more user interface application(s) 410, which may receive requests from various client computing devices, and may communicate appropriate responses to the requesting client devices. For example, the user interface application(s) 410 may receive requests in the form of Hypertext Transport Protocol (HTTP) requests, or other web-based, application programming interface (API) requests. An application server 408 working in conjunction with the one or more user interface application(s) 410 may generate various user interfaces (e.g., web pages) with data retrieved from various data sources stored in the data 406. In some embodiments, individual application(s) (e.g., applications 212,408-416) may be used to implement the functionality associated with various services and features of the system 100. For instance, extracting one or more features from the electronic presentation content may be handled by a feature extraction engine 412.

In one embodiment, the feature extraction engine 412 determines the electronic presentation features 208 from the electronic presentation content 418 by classifying and identifying the electronic presentation content 418. Examples of the determined electronic presentation features 208 include extracted tokens from the electronic presentation content 418 (e.g., via a tokenizer), a detected language of the electronic presentation (e.g., English, Spanish, Japanese, German, etc.), one or more named entities (e.g., proper nouns, names, specific locations, etc.), one or more topics associated with the electronic presentation, one or more skills associated with a given electronic presentation, one or more n-grams, various style features (e.g., font, typeface, background, colors, use of bullets, animations), and the quality of a given electronic presentation. Quality for a given electronic presentation may be denoted on a sliding scale, where quality may correlate to how each slide of an electronic presentation is structured, such as a ratio of graphics and text, where there is a company name used in the slide and/or electronic presentation (e.g., how well known the company is), a hyperlink to the presentation author's website or user profile, whether the electronic presentation has been viewed over a given threshold (e.g., a viewing threshold), whether one or more users has indicated a preference for the electronic presentation (e.g., has "liked" the electronic presentation), and other such features.

Based on the determined features, the social networking server 104 may determine one or more recommendations for a given electronic presentation using the presentation recommendation engine 414. In one embodiment, the presentation recommendation engine 414 determines other electronic presentations to recommend through a machine-learning process, such as a supervised learning binary classification process. In supervised learning, each example is a pair consisting of an input object (e.g., a vector) and a desired output value (e.g., the supervisory signal). Using the supervised learning process, the presentation recommendation engine 414 may analyze training data (e.g., extracted content, extracted features, etc.) and produces an inferred function, which may then be used for mapping new examples. The machine-learning process may yield a model, which may be employed to determine whether a given electronic presentation would be interesting to a user. The model may be generic across electronic presentations or may be specific for a given electronic presentation (e.g., each electronic presentation may be associated with its own model for determining whether the given electronic presentation is to be recommended).

In one embodiment, the features for a given electronic presentation are provided to the model, which may indicate whether the electronic presentation should be recommended. In another embodiment, the presentation recommendation engine 414 provides user behavior information and user profile information to the model, which then determines which electronic presentations to recommend or whether a given electronic presentation is to be recommended. Combinations and variations of the foregoing embodiments are also possible.

Recommendations for electronic presentations may also be based on user behavioral data and/or user profile data (e.g., user data 210). User behavioral data may include such information as the amount of time spent viewing a given electronic presentation, how much of a given electronic presentation has been viewed, whether the user has viewed other electronic presentations and, if so, any genres assigned to the other electronic presentations, and other such user behavioral data. Other user behavioral data may include whether a user has selected an electronic presentation, how much of a given electronic presentation remains, how much time has been spent on the given electronic presentation or a given portion (e.g., a slide) of the electronic presentation, whether the electronic presentation has been selected for sharing with other users, whether the user has opted to e-mail the electronic presentation, whether the user has commented or downloaded the electronic presentation, and whether the user has embedded the electronic presentation in another website.

User profile data may include information about the user such as the user's occupation, the user's employment history, any companies being followed by the user, and other such user profile data. The user data recommendation engine 416 may reference one or more databases maintained by the social networking server 104 to obtain the user profile data.

In one embodiment, a user data recommendation engine 416 may recommend one or more electronic presentations based on the user data 210. The user data recommendation engine 416 may recommend the one or more electronic presentations based on the user data 210 by comparing and/or matching user data 210. In one embodiment, the user data recommendation engine 416 may train and/or employ a model which, when provided with the user data 210, determines which electronic presentations to recommend for the user. Alternatively, or in addition, the model may determine whether to recommend a given electronic presentation for a specific user. Furthermore, the recommendations determined by the presentation recommendation engine 414 may be supplemented or modified with the recommendations determined by the user data recommendation engine 416. Combinations or variations of the foregoing are also possible.

Figure 5A:
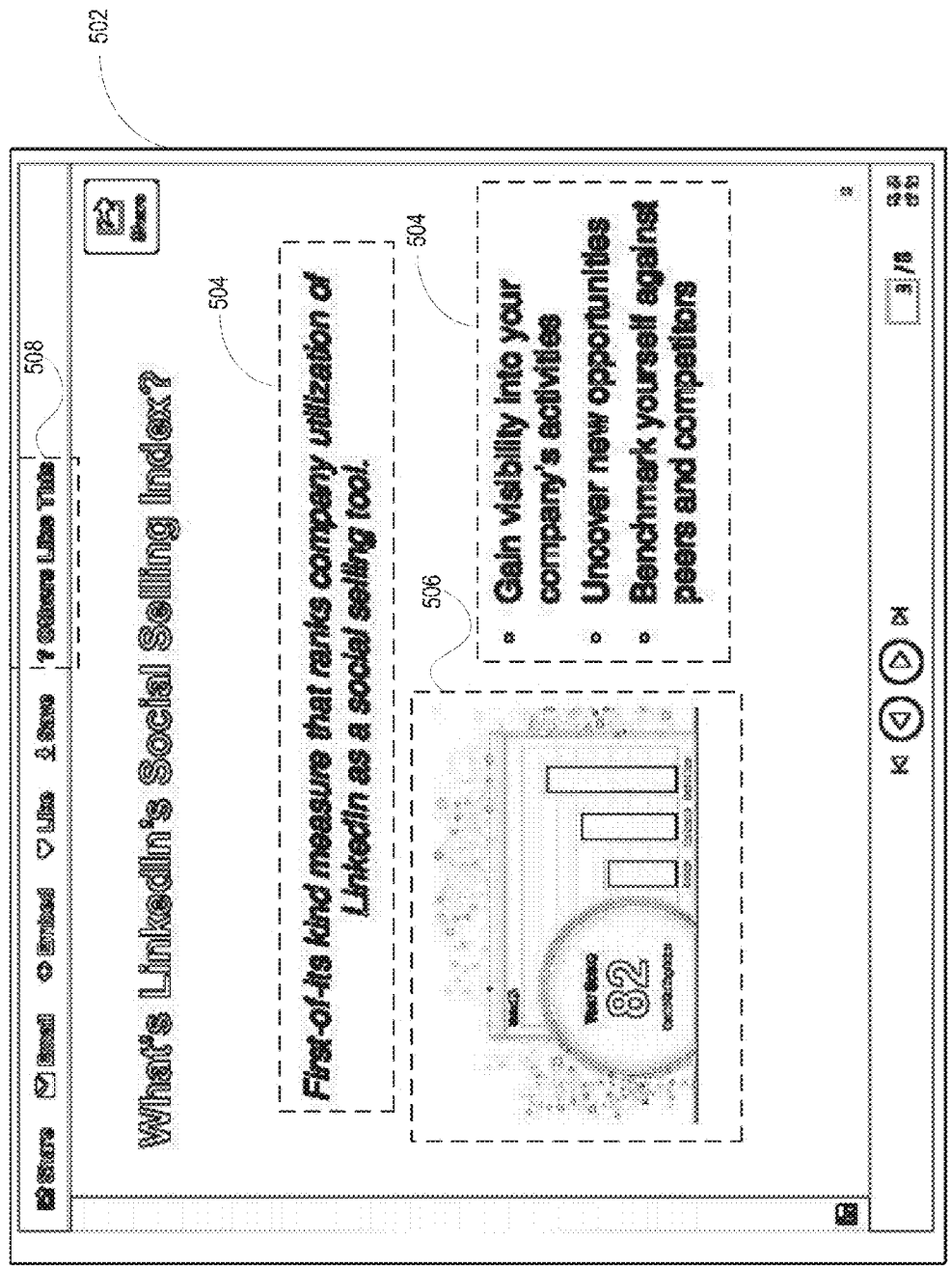
FIG. 5A illustrates a graphical user interface, in accordance with an example embodiment, displaying an electronic presentation hosted by the electronic presentation server.

FIG. 5A illustrates a graphical user interface, in accordance with an example embodiment, displaying an electronic presentation 502 hosted by the electronic presentation server 116. In one embodiment, the electronic presentation 502 may include multiple types of content, such as graphical content 506 and textual content 504. An electronic presentation may also include other types of content, such as sounds, movies, or other audiovisual content. Referring to FIGS. 3-4, the content extraction engine 314 may be configured to extract the graphical content 506 and the textual content 504 from the electronic presentation 502. For example, the content extraction engine 314 may perform optical character recognition on the textual content 504 and image recognition on the graphical content 506. Once the content 504,506 has been extracted from the electronic presentation 502, the feature extraction engine 412 may then extract the features from the graphical content 504,506. The features may then form the basis for the recommendation of other electronic presentations.

In addition, the graphical user interface may include a graphical element 508 for displaying electronic presentations similar to the one being viewed (e.g., for displaying recommended electronic presentations). In one embodiment, the graphical user interface may include a graphical element 508 labeled "Others Like This," which, when selected, may display one or more electronic presentations similar to the electronic presentation 502. The one or more electronic presentations displayed in response to the graphical element 508 being selected may be based on the recommendations determined by the social networking server 104.

Figure 5B:
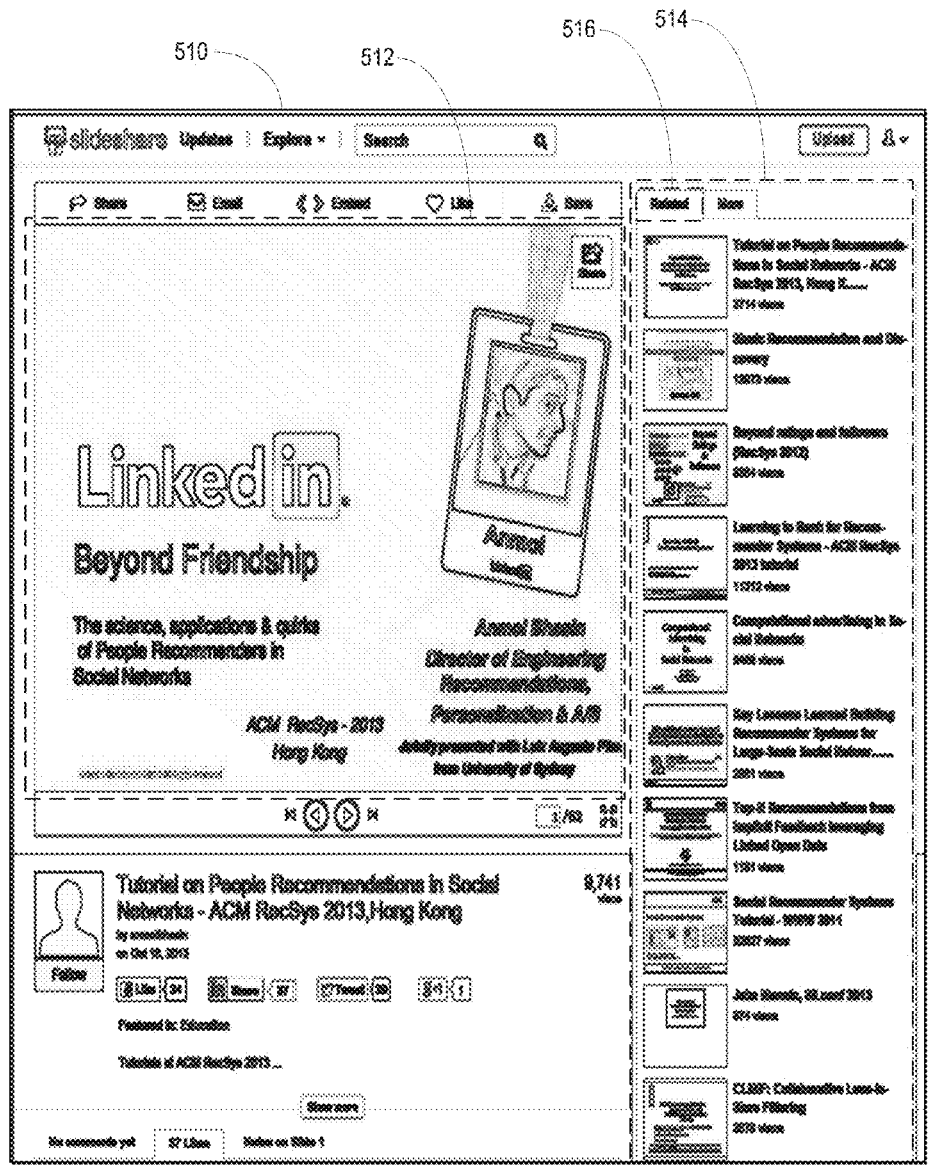
FIG. 5B illustrates another graphical user interface, in accordance with another example embodiment, displaying an electronic presentation hosted by the electronic presentation server.

FIG. 5B illustrates another graphical user interface 510, in accordance with another example embodiment, displaying an electronic presentation 512 hosted by the electronic presentation server 116. As shown in FIG. 5B, the graphical user interface 510 may include a container element 514 configured to display electronic presentations related to the electronic presentation 512 being viewed. In the embodiment shown in FIG. 5B, the container element 514 includes a selectable element 516, titled "Related," that, when selected, displays a listing of the related electronic presentations. The selectable element 516 may be selectable because the container element 514 may include other selectable elements, such as a selectable element that, when selected, displays electronic presentations authored by the author of the electronic presentation 512 being viewed. In this way, the electronic presentation server 116 presents related electronic presentations in a streamlined and time-efficient manner to the user so that the user avoids having to spend time searching for other electronic presentations which may be similar to the electronic presentation 512 being viewed.

Figure 6:
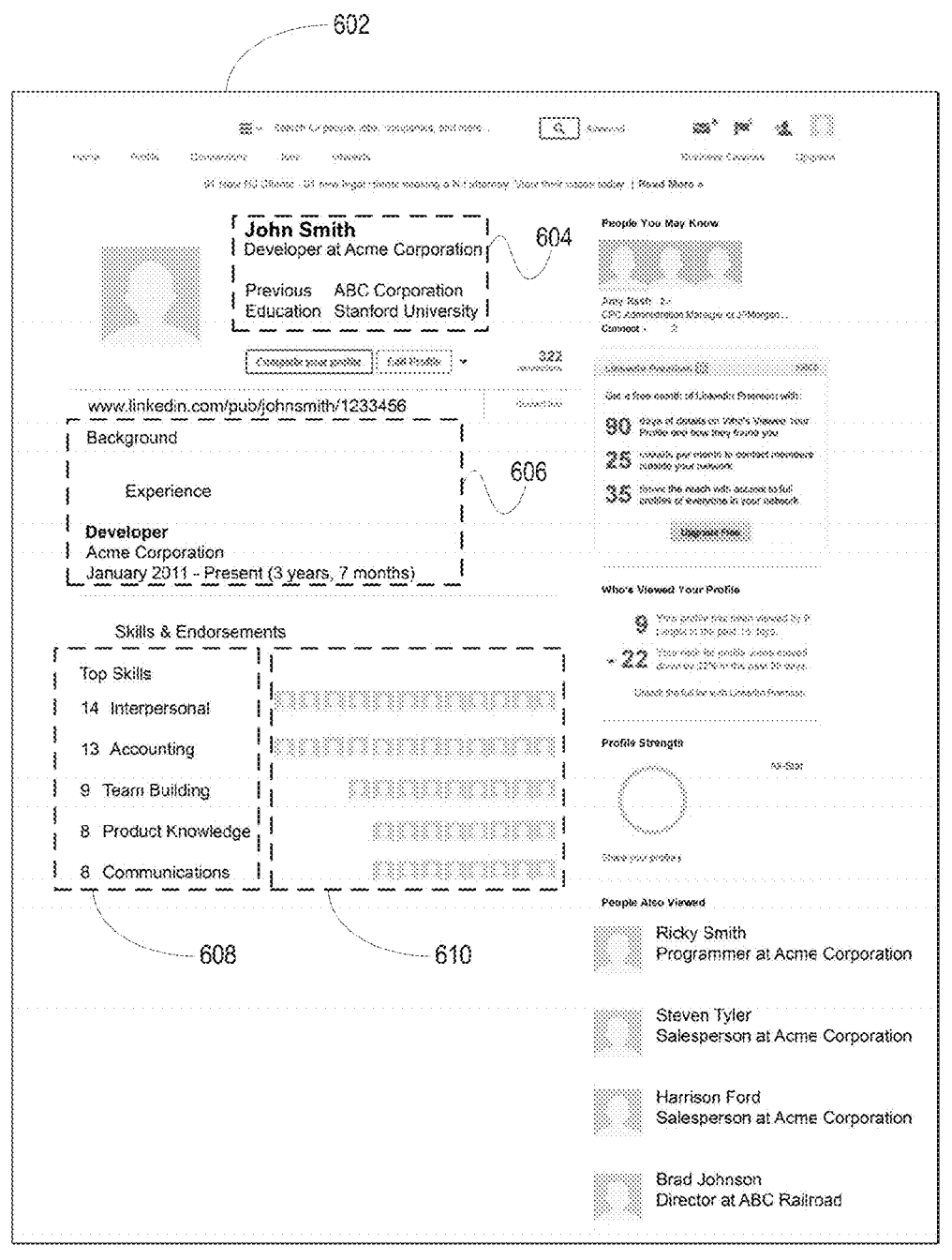

Additionally, or alternatively, when a user accesses the electronic presentation server 116, the user may be presented with one or more recommended electronic presentations. As discussed previously, the one or more recommended electronic presentations may also be recommended based on information obtained/extracted from a member profile associated with the user. FIG. 6 illustrates a member profile 602, in accordance with an example embodiment, that may be hosted by the social networking server 104. The social networking server 104 may process information associated with the member profile 602 to determine one or more recommendations for a given electronic presentation. In one embodiment, the social networking server 104 may extract information from one or more portions of the member profile 602 including, but not limited to, a headline portion 604, an employment history portion 606, a skills portion 608, and an endorsement portion 610. Other information that the social networking server 104 may extract from a given profile, but not shown in FIG. 6, may include companies a member is following, status or network updates a member has posted, hyperlinks a member has included in said status or network updates, and other such information. While the social networking server 104 may extract information from the various portions of the member profile 602, one of ordinary skill in the art will recognize that the social networking server 104 may extract information from other portions as well.

The headline portion 604 may include a brief summary of the member, including the member's name, current position, current job title, current employer, where the member was educated, and other such summary information. The employment history portion 606 may include a record of past employers of the member, including the member's past positions, the member's past job functions, the duration of the member's employment, and other such employment history information. The skills portion 608 may include a list of one or more skills the member has identified as possessing and may (or may not) be relevant to the member's current employment. The endorsement portion 610 may include a list of members of the social networking site that have endorsed the member of the member profile 602 for a given skill. Members that have endorsed a another member (e.g., "endorsers") may be relevant to determining recommended electronic presentations for a given member (e.g., "endorsee") because the endorsee may be interested in viewing or reading electronic presentations that are relevant to the endorsers job or industry. By extracting a member's profile information and using that information in determining recommended electronic presentations, the social networking server 104 and/or the electronic presentation server 116 delivers better targeted (e.g., more relevant to the user's interests, employment, etc.) electronic presentations. Thus, recommended electronic presentations based on the member's profile contributes to an overall more engaging user experience and encourages the user to explore the electronic presentations hosted by the electronic presentation server.

Figure 7A:
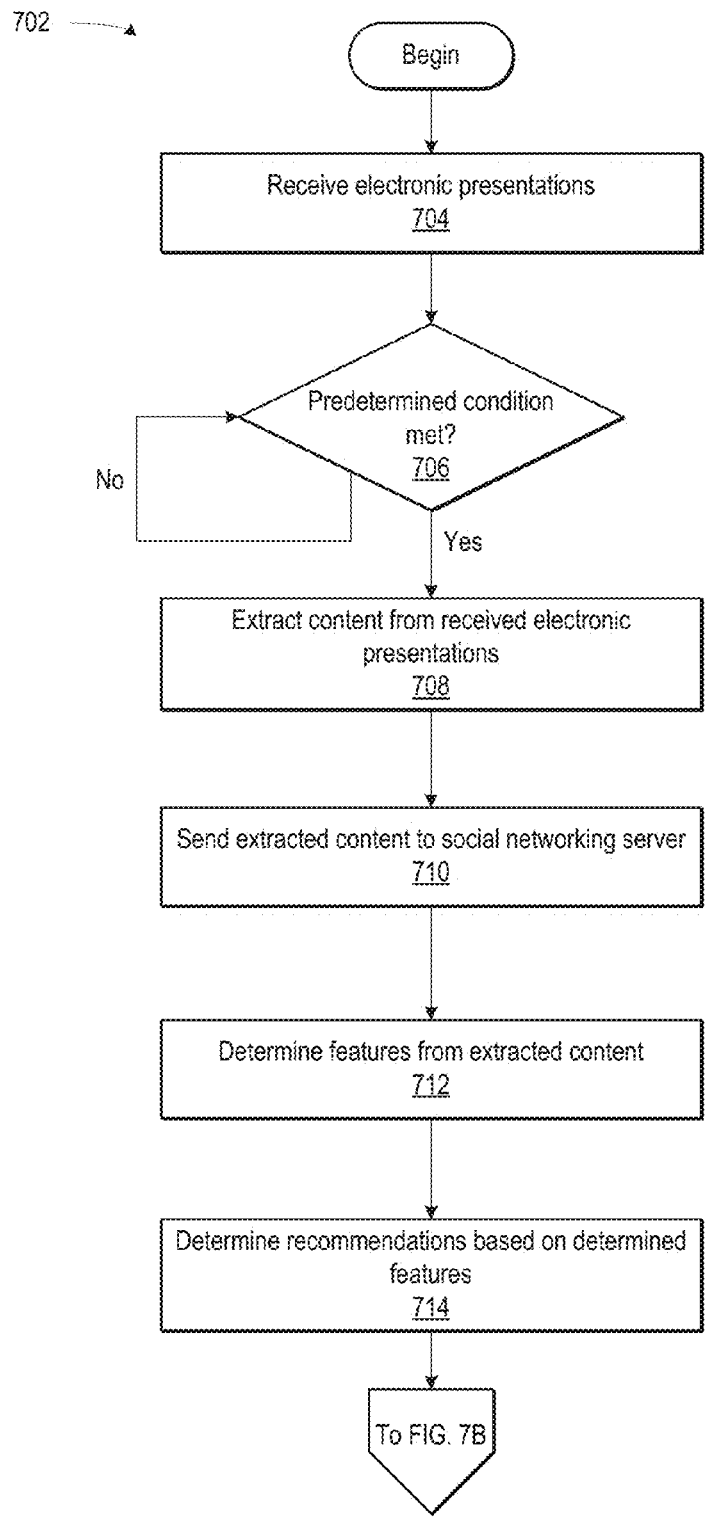
FIGS. 7A-7B illustrate a method, in accordance with an example embodiment, for determining recommendations of electronic presentations.
Figure 7B:
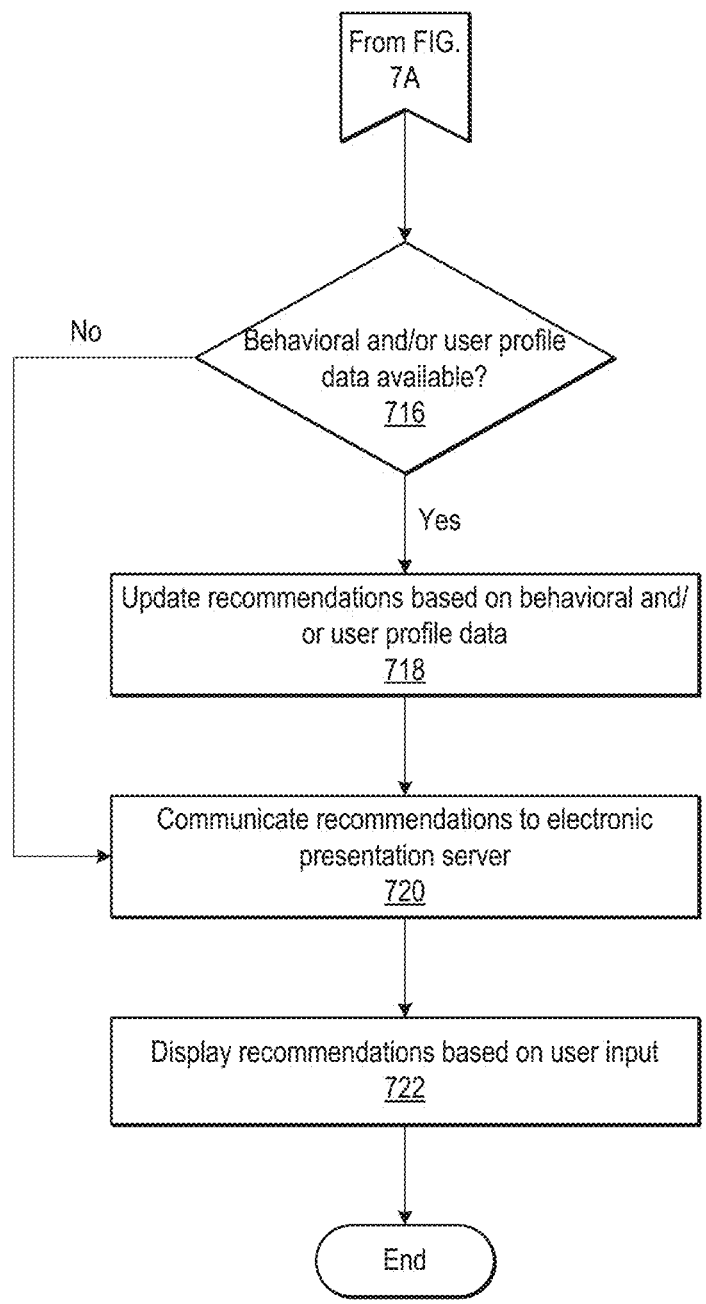

FIGS. 7A-7B illustrate a method 702, in accordance with an example embodiment, for determining recommendations of electronic presentations. The method 702 may be implemented by the electronic presentation server 116 and the social networking server 104 and, accordingly, is merely described by way of reference thereto. Initially, the electronic presentation server 116 may receive one or more electronic presentations 204 (Operation 704). For example, the electronic presentation server 116 may receive the one or more electronic presentations 204 from one or more user devices 102.

The electronic presentation server 116 may then determine whether one or more conditions have been met (Operation 706). As discussed above, the condition may be the expiration of a predetermined time interval, a user logging in or accessing the electronic presentation server 116, or a combination of conditions.

The electronic presentation server 116 may then extract content from one or more of the electronic presentations (Operation 708). As discussed above, the extracted content may include graphical content extracted using one or more image recognition techniques, textual content extracting using one or more optical character recognition techniques, audio content, and other types of content.

The extracted content may then be communicated to the social networking server 104 (Operation 710). Using one or more engines, such as the feature extraction engine 412, the social networking server 104 may determine one or more features from the extracted content (Operation 712). As discussed above, the features may include tokens from the electronic presentation content (e.g., via a tokenizer), a detected language of the electronic presentation (e.g., English, Spanish, Japanese, German, etc.), one or more named entities (e.g., proper nouns, names, specific locations, etc.), one or more topics associated with the electronic presentation, one or more skills associated with a given electronic presentation, one or more n-grams, various style features (e.g., font, typeface, background, colors, use of bullets, animations), and the quality of a given electronic presentation.

Having determine one or more features from the extracted content, the social networking server 104 may then determine one or more recommendations based on the determined features (Operation 714). The recommendations may include one or more electronic presentations stored by the electronic presentation server 116.

The social networking server 104 may then determine whether user behavioral data and/or user profile data is available (Operation 716). As discussed above, the user behavioral data may include data relating to interactions with a given electronic presentation and the user profile data may include data about a member of the social networking site maintained by the social networking server 104. Where such data is available, the social networking server 104 may update and/or modify prior recommendations determined from the features of the electronic presentations (Operation 718).

Thereafter, the social networking server 104 may communicate one or more recommendations to the electronic presentations server 116 (Operation 720). The electronic presentations server 116 may then display the determined recommendations automatically or manually, such when a user of the electronic presentation server 116 requests recommendations for a given electronic presentation or when an electronic presentation is displayed (Operation 722).

Figure 8:
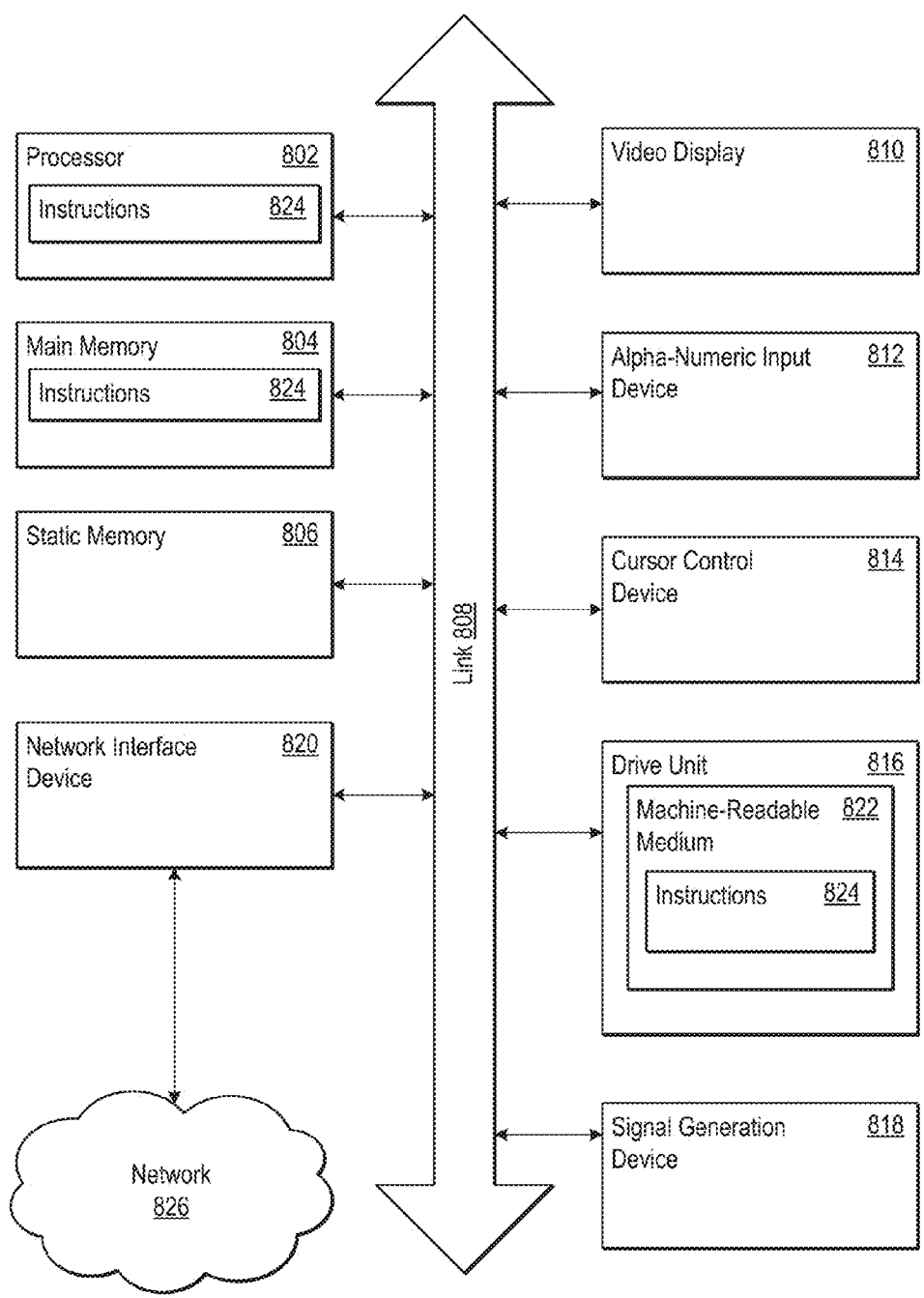
FIG. 8 is a block diagram illustrating components of a machine, in accordance with an example embodiment, configured to read instructions from a machine-readable medium.

FIG. 8 is a block diagram illustrating components of a machine 800, in accordance with an example embodiment, configured to read instructions from a machine-readable medium (e.g., a machine-readable storage medium) and perform any one or more of the methodologies discussed herein. Specifically, FIG. 8 shows a diagrammatic representation of the machine 800 in the example form of a computer system and within which instructions 824 (e.g., software) for causing the machine 800 to perform any one or more of the methodologies discussed herein may be executed. In alternative examples, the machine 800 operates as a standalone device or may be connected (e.g., networked) to other machines. In a networked deployment, the machine 800 may operate in the capacity of a server machine or a client machine in a server-client network environment, or as a peer machine in a peer-to-peer (or distributed) network environment. The machine 800 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 824, sequentially or otherwise, that specify actions to be taken by that machine. Further, while only a single machine is illustrated, the term "machine" shall also be taken to include a collection of machines that individually or jointly execute the instructions 824 to perform any one or more of the methodologies discussed herein.

The machine 800 includes a processor 802 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 804, and a static memory 806, which are configured to communicate with each other via a bus 808. The machine 800 may further include a graphics display 810 (e.g., a plasma display panel (PDP), a light emitting diode (LED) display, a liquid crystal display (LCD), a projector, or a cathode ray tube (CRT)). The machine 800 may also include an alphanumeric input device 812 (e.g., a keyboard), a cursor control device 814 (e.g., a mouse, a touchpad, a trackball, a joystick, a motion sensor, or other pointing instrument), a storage unit 816, a signal generation device 818 (e.g., a speaker), and a network interface device 820.

The storage unit 816 includes a machine-readable medium 822 on which is stored the instructions 824 (e.g., software) embodying any one or more of the methodologies or functions described herein. The instructions 824 may also reside, completely or at least partially, within the main memory 804, within the processor 802 (e.g., within the processor's cache memory), or both, during execution thereof by the machine 800. Accordingly, the main memory 804 and the processor 802 may be considered as machine-readable media. The instructions 824 may be transmitted or received over a network 826 via the network interface device 820.

In this manner, a user visiting a web site hosted by the electronic presentation server 116 may receive recommended electronic presentations based on a given electronic presentation. With recommended electronic presentations available to the user, a user is more likely to engage the electronic presentation web site. Furthermore, the electronic presentations presented to the user are more likely to be relevant to a user and saves the user time and effort in having to find electronic presentations that may be of interest to the user.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 722 is shown in an example to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine (e.g., machine 800), such that the instructions, when executed by one or more processors of the machine (e.g., processor 802), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The invention claimed is:

1. A computer-implemented method comprising:
extracting presentation content from a first electronic presentation being accessible to a plurality of users, the presentation content including at least one of graphical content, textual content, or audio content;
determining a first plurality of features from the extracted presentation content, the first plurality of features representing individual elements used to construct the extracted presentation content;
obtaining user behavior data for the first electronic presentation, the user behavior data indicating interactions with the first electronic presentation; and
providing the determined first plurality of features and the user behavior data to a machine-learning model, wherein the machine-learning model determines a second electronic presentation as a recommended electronic presentation based on the provided first plurality of features and the provided user behavior data.

2. The computer-implemented method of claim 1, wherein extracting presentation content from the first electronic presentation occurs based on a predetermined condition being satisfied.

3. The computer-implemented method of claim 2, wherein the predetermined condition is the expiration of a predetermined time interval.

4. The computer-implemented method of claim 1, further comprising obtaining user profile data for a user having requested the first electronic presentation; and
wherein the determining of the second electronic presentation is further based on the obtained user profile data.

5. The computer-implemented method of claim 1, further comprising:
causing the display of the recommended electronic presentation based on a user having viewed the first electronic presentation.

6. The method of claim 1, wherein the first plurality of features include at least one of: extracted tokens from the extracted presentation content, a detected language of the extracted presentation content, or a style feature of the extracted presentation content.

7. The method of claim 1, further comprising:
generating a graphical user interface that displays:
the first electronic presentation; and
a container element comprising:
a first selectable element, wherein selecting the first selectable element causes the container element to display a first plurality of electronic presentations determined as being related to the first electronic presentation; and
a second selectable element, wherein selecting the second selectable element causes the container element to display a second plurality of electronic presentations having been authored by an author of the first electronic presentation; and
communicating the graphical user interface for display.

8. A system comprising:
a non-transitory, computer-readable medium storing computer-executable instructions; and
one or more processors in communication with the non-transitory, computer-readable medium that, having executed the computer-executable instructions, are configured to:
extract presentation content from a first electronic presentation being accessible to a plurality of users, the presentation content including at least one of graphical content, textual content, or audio content;
determine a first plurality of features from the extracted presentation content, the first plurality of features representing individual elements used to construct the extracted presentation content;
obtain user behavior data for the first electronic presentation, the user behavior data indicating interactions with the first electronic presentation; and
provide the determined first plurality of features and the user behavior data to a machine-learning model, wherein the machine-learning model determines a second electronic presentation as a recommended electronic presentation based on the provided first plurality of features and the provided user behavior data.

9. The system of claim 8, wherein the presentation content extracted from the first electronic presentation occurs based on a predetermined condition being satisfied.

10. The system of claim 9, wherein the predetermined condition is the expiration of a predetermined time interval.

11. The system of claim 8, wherein the one or more processors are further configured to obtain user profile data for a user having requested the first electronic presentation; and
wherein the second electronic presentation is further determined based on the obtained user profile data.

12. The system of claim 8, wherein the one or more processors are further configured to cause the display of the recommended electronic presentation based on a user having viewed the first electronic presentation.

13. The system of claim 8, wherein the first plurality of features include at least one of: extracted tokens from the extracted presentation content, a detected language of the extracted presentation content, or a style feature of the extracted presentation content.

14. The system of claim 8, wherein the one or more processors are further configured to:
generate a graphical user interface that displays:
the first electronic presentation; and
a container element comprising:
a first selectable element, wherein selecting the first selectable element causes the container element to display a first plurality of electronic presentations determined as being related to the first electronic presentation; and
a second selectable element, wherein selecting the second selectable element causes the container element to display a second plurality of electronic presentations having been authored by an author of the first electronic presentation; and
communicate the graphical user interface for display.

15. A computer-implemented method comprising:
receiving a plurality of electronic presentations, the plurality of electronic presentations being accessible to a plurality of users via an electronic presentation system;
based on a predetermined condition being met, extracting content for each of the plurality of electronic presentations;
communicating the extracted content from the electronic presentation system to a social networking system;
determining a first plurality of features from the extracted content, the first plurality of features representing individual elements used to construct the extracted content;
obtaining user behavior data for one or more of the electronic presentations, the user behavior indicating interactions with corresponding electronic presentations selected from the one or more electronic presentations;

providing the determined first plurality of features and the user behavior data to a machine-learning model, wherein the machine learning model determines a recommended electronic presentation selected from the plurality of electronic presentations for a given electronic presentation selected from the plurality of electronic presentations; and communicating the determined recommended electronic presentation to the electronic presentation system.

16. The computer-implemented method of claim 15, wherein the predetermined condition comprises an expiration of a predetermined time interval.

17. The computer-implemented method of claim 15, wherein the extracted content comprises at least one of a graphic, text, or audio.

18. The computer-implemented method of claim 15, wherein the user interactions comprise which electronic presentations from the plurality of electronic presentations the user has viewed after having viewed the given electronic presentation.

19. The computer-implemented method of claim 15, wherein the determined recommendation electronic presentation is displayed in response to the given electronic presentation being viewed by a user.

20. The computer-implemented method of claim 15, further comprising:

generating a graphical user interface that displays:
the first electronic presentation; and
a container element comprising:
a first selectable element, wherein selecting the first selectable element causes the container element to display a first plurality of electronic presentations determined as being related to the first electronic presentation; and
a second selectable element, wherein selecting the second selectable element causes the container element to display a second plurality of electronic presentations having been authored by an author of the first electronic presentation; and
communicating the graphical user interface for display.

* * * * *

UNITED STATES PATENT AND TRADEMARK OFFICE
CERTIFICATE OF CORRECTION

PATENT NO. : 9,787,785 B2  
APPLICATION NO. : 14/473576  
DATED : October 10, 2017  
INVENTOR(S) : Liu et al.

Page 1 of 1

It is certified that error appears in the above-identified patent and that said Letters Patent is hereby corrected as shown below:

In the Claims

In Column 17, Line 13, in Claim 1, after "presentation;", delete "¶"

In Column 17, Line 39, in Claim 6, before "method", insert --computer-implemented--

In Column 17, Line 44, in Claim 7, before "method", insert --computer-implemented--

In Column 18, Line 9, in Claim 8, after "presentation;", delete "¶"

Signed and Sealed this  
Twenty-fifth Day of June, 2019

Andrei Iancu  
*Director of the United States Patent and Trademark Office*